US012718264B2

(12) United States Patent
Baysal et al.

(10) Patent No.: US 12,718,264 B2
(45) **Date of Patent: *Aug. 25, 2026**

(54) CONTEXTUAL CONTENT OPTIMIZATION

(71) Applicant: Quantcast Corporation, San Francisco, CA (US)

(72) Inventors: Sermetcan Baysal, London (GB); Andrew Stoddart, London (GB)

(73) Assignee: Quantcast Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/958,697

(22) Filed: Nov. 25, 2024

(65) Prior Publication Data

US 2025/0200605 A1 Jun. 19, 2025

Related U.S. Application Data

(63) Continuation of application No. 18/303,244, filed on Apr. 19, 2023, now Pat. No. 12,154,131, which is a continuation of application No. 17/243,462, filed on Apr. 28, 2021, now abandoned.

(60) Provisional application No. 63/017,210, filed on Apr. 29, 2020.

(51) Int. Cl.

| | |
|---|---|
| ***G06Q 30/0242*** | (2023.01) |
| ***G06F 3/0482*** | (2013.01) |
| ***G06F 16/2457*** | (2019.01) |
| ***G06Q 30/0241*** | (2023.01) |
| ***G06Q 30/0251*** | (2023.01) |
| ***G06Q 30/0273*** | (2023.01) |

(52) U.S. Cl.

CPC ....... *G06Q 30/0244* (2013.01); *G06F 3/0482* (2013.01); *G06F 16/24575* (2019.01); *G06Q 30/0256* (2013.01); *G06Q 30/0263* (2013.01); *G06Q 30/0275* (2013.01); *G06Q 30/0277* (2013.01)

(58) Field of Classification Search

None

See application file for complete search history.

(56) References Cited

U.S. PATENT DOCUMENTS

| | | | | |
|---|---|---|---|---|
| 2009/0043660 A1* | 2/2009 | Lee | G06Q 30/02 | 705/14.25 |
| 2011/0264507 A1* | 10/2011 | Zhou | G06Q 30/02 | 705/14.42 |
| 2012/0265606 A1* | 10/2012 | Patnode | G06Q 30/0242 | 705/14.41 |
| 2015/0186937 A1* | 7/2015 | Lui | G06F 16/313 | 705/14.54 |
| 2016/0232162 A1* | 8/2016 | Dzumla | G06F 16/9535 | |
| 2019/0116128 A1* | 4/2019 | Guo | H04L 67/1021 | |
| 2020/0273069 A1* | 8/2020 | Palaic | G06F 40/279 | |

* cited by examiner

*Primary Examiner* — Allan J Woodworth, II

(74) *Attorney, Agent, or Firm* — Andrea Wheeler, USPTO Reg. #73780

(57) ABSTRACT

A contextual optimization system consistently and reliably determines the context of locations of content and provides an interactive user interface that enables optimization of selection of highly relevant content locations by easily viewing the intersection of information related to actual content, relevance of context, and selections of content locations.

3 Claims, 11 Drawing Sheets

CONTEXTUAL CONTENT OPTIMIZATION

CROSS-REFERENCE TO RELATED APPLICATIONS

This application is a continuation of U.S. patent application Ser. No. 18/303,244, entitled "Contextual Content Optimization," by Sermetcan Baysal and Andrew Stoddart, filed on Apr. 19, 2023, which is a continuation of U.S. patent application Ser. No. 17/243,462, entitled "Contextual Content Optimization," by Sermetcan Baysal and Andrew Stoddart, filed on Apr. 28, 2021, now abandoned, which claims the benefit of priority to U.S. Provisional Application No. 63/017,210 entitled "Contextual Interest-Based Audience Optimization," by Sermetcan Baysal and Andrew Stoddart, filed on Apr. 29, 2020, all of which are hereby incorporated by reference in its entirety.

BACKGROUND

A campaign manager identifies target entities to receive supplemental content. A campaign manager must pay for the opportunity to provide supplemental content to each entity; therefore, a campaign manager uses various methods to identify entities that are likely to take a specific action or "convert" (e.g., view an ad, make a selection, purchase a product, form a favorable impression, etc.) based on receiving the supplemental content. A campaign manager may use the context of a web site that an entity is visiting as an indicator that the entity is likely to convert after viewing the supplemental content. For example, a manager of a campaign about dog food may target entities visiting a site about dogs to receive supplemental content related to the campaign about dog food. However, relying on information provided by publishers to determine the topic (or context) of the content of sites is unreliable. Topics provided by publishers may not match the most relevant topic of a site or sub-site, or may not reflect all of the topics on a site or sub-site. In one example, the publisher of a site may identify, or "label," the topic of the overall domain as pet related, but a particular sub-site may be related only to cats, and thus entities visiting the sub-site about cats may not be appropriate targets for supplemental content related to dog food. In another example, the publisher of a site may identify the corresponding topic as animal content, but the content may be primarily related to wild animals, and thus entities visiting the site may not be appropriate targets for supplemental content related to dog food. Furthermore, a publisher may not provide the topics or context associated with a site (i.e., an "unlabeled" site).

A campaign manager may receive information about the number of entities who visit a site (i.e., the "site audience size") from the publisher of the site or by other means. The campaign manager may then select sites based on the published context of the sites and the audience size of the site. For example, a campaign manager may select a number of sites with the published context of "dog," which may then yield a potential (or approximate) audience size (i.e., "total" audience size). Or the campaign manager may select a number of sites with the published context of "dog" or "pet," which may yield a larger number of sites and a larger potential audience size. However, this approach does not take relevance into account. For example, sites with a published context of "pet" may include sites that have little content related to dogs and so the relevance of the topic of dog is low for those sites. While this approach may yield a desired potential audience size, it may not yield a desired audience relevance (i.e., "total" audience relevance), which may result in fewer visitors taking the desired action. The current approach does not enable a more precise selection of sites balancing actual context of sites with potential audience size to yield a desired potential audience size with a desired audience relevance.

The current approach also does not take cost into account. For example, a campaign manager may select a number of sites with the published context of "dog food," which may then yield an acceptable potential audience size. However, one of the selected sites may require a very high price per opportunity (i.e., a high "site" audience cost). Thus, the cost to reach the targeted potential audience (i.e., the "audience cost" or "total" audience cost) may exceed a desired budget. The campaign manager may block that one site but the resulting potential audience size may be too low for the campaign goals. The campaign manager may add a number of sites with a published context of "dog," but the resulting potential audience may not be highly relevant to a campaign for dog food (i.e., low audience relevance or low "total" audience relevance). The current approach does not enable a more precise selection of sites balancing actual context of sites with potential audience size and potential audience cost to yield a desired potential audience size with a desired audience relevance and a desired audience cost. Furthermore, because audience size, audience relevance, and audience cost are all inter-related factors, changing one factor may change both of the other factors in unpredictable ways. The current approach does not provide a way for a campaign manager to incrementally adjust these factors, taking their inter-relationships into account, to optimize site selection for desired audience size, audience relevance, and audience cost.

What is needed is system, a non-transitory computer-readable storage medium, and a method for a campaign manager or campaign control system to consistently and reliably determine the context of sites and to provide a mechanism that enables a campaign manager to optimize site selections to yield a desired target audience by viewing the intersection of actual site context, relevance of site context, site audience size, site audience cost, audience size, audience cost, and audience relevance, and to iterate the selection of sites until a preferred combination of audience size, audience cost, and audience relevance is reached.

SUMMARY

A contextual interest-based audience optimization system (hereinafter "optimization system") accesses content of published sites. A published site may be a web site, a mobile site, a mobile/desktop application, or a video delivery service (e.g., television, streaming service, or connected TV). The content may comprise text, graphical, video, audio, and metadata content. The optimization system analyzes the content to identify the context corresponding to each site. The optimization system may present the context as topics associated with each site, and may rank the topics on each site according to the relevance and/or prevalence of each topic on the site. The optimization system also uses the content analysis to identify keywords associated with each site and may rank the keywords on each site according to the relevance and/or prevalence of each keyword to the site. The optimization system uses the identified context, topics, and/or keywords associated with sites to analyze the relevance of each site (compared to a desired context (i.e., "site relevance"). The optimization system may rank sites according to their relevance compared to a desired context. The optimization system determines an approximate number of entities visiting, viewing, accessing, or using (i.e., "visiting") each site (i.e., "site audience size"). The optimization system determines an approximate audience cost to provide supplemental content to entities visiting each site (i.e., "site audience cost"). The optimization system provides a user interface that enables a user, such as a campaign manager or campaign control system, to view the identified context, topics, and/or keywords and their respective ranks corresponding to each site, the determined relevance of each site compared to a desired context, and the site audience size and site audience cost corresponding to each site. The user interface enables the user to see the intersection of actual site context, site relevance of site context, site audience size, site audience cost, and to see the impact of selections related to one factor on each of the other factors. These factors (actual site context, site relevance, site audience size, site audience cost, audience relevance, audience size, audience cost) have complex and unpredictable inter-relationships. For example, selecting sites of higher relevance may decrease audience size but audience cost may increase or decrease. The user can select sites based on desired audience relevance and/or audience size and/or cost, see the effect of the selection on the other factors, and then continue to make iterative selections to optimize the selection of sites until a preferred combination of audience size, audience cost, and audience relevance is reached.

The optimization system provides several advantages. The optimization system determines information about the actual context of sites, which is more accurate and comprehensive than the context provided by publishers. The optimization system determines a relevance of sites compared to a desired context based on their actual context, which more accurate than relying on the context provided by publishers. The optimization system provides a determination of audience relevance corresponding to each site, based on the determined relevance of the site compared to a desired context, which is more accurate than audience relevance provided by publishers.

The prior solutions do not address the complexities of the inter-relationships between the factors of actual site context, site relevance, site audience size, site audience cost, audience relevance, audience size, and audience cost. The optimization system enables a user to select sites based on these complex, inter-related factors and enables the user continue to make iterative selections to optimize the selection of sites until a preferred combination of audience size, audience cost, and audience relevance is reached.

Because the prior solutions do not offer the capabilities of the disclosed invention, users of prior solutions, such as campaign managers and campaign control systems, had to make a selection of sites, then execute campaigns to see the results, and then modify the selection of sites. Using the disclosed invention, users can see the estimated results of site selection prior to executing a campaign. Furthermore, the optimization system uses a combination of off-line and real-time analysis capabilities to enable a user to quickly make iterative selections in real-time, without waiting for results of campaign execution, to optimize the selection of sites.

DETAILED DESCRIPTION OF THE INVENTION

Disclosed is a method implementing a contextual interest-based audience optimization system which enables a user, such as a campaign manager or a campaign control system, to quickly iterate selections of sites, which will be used to serve supplemental content to browsers, based on the complex inter-related factors of audience size, audience cost, and audience relevance.

Figure 1:
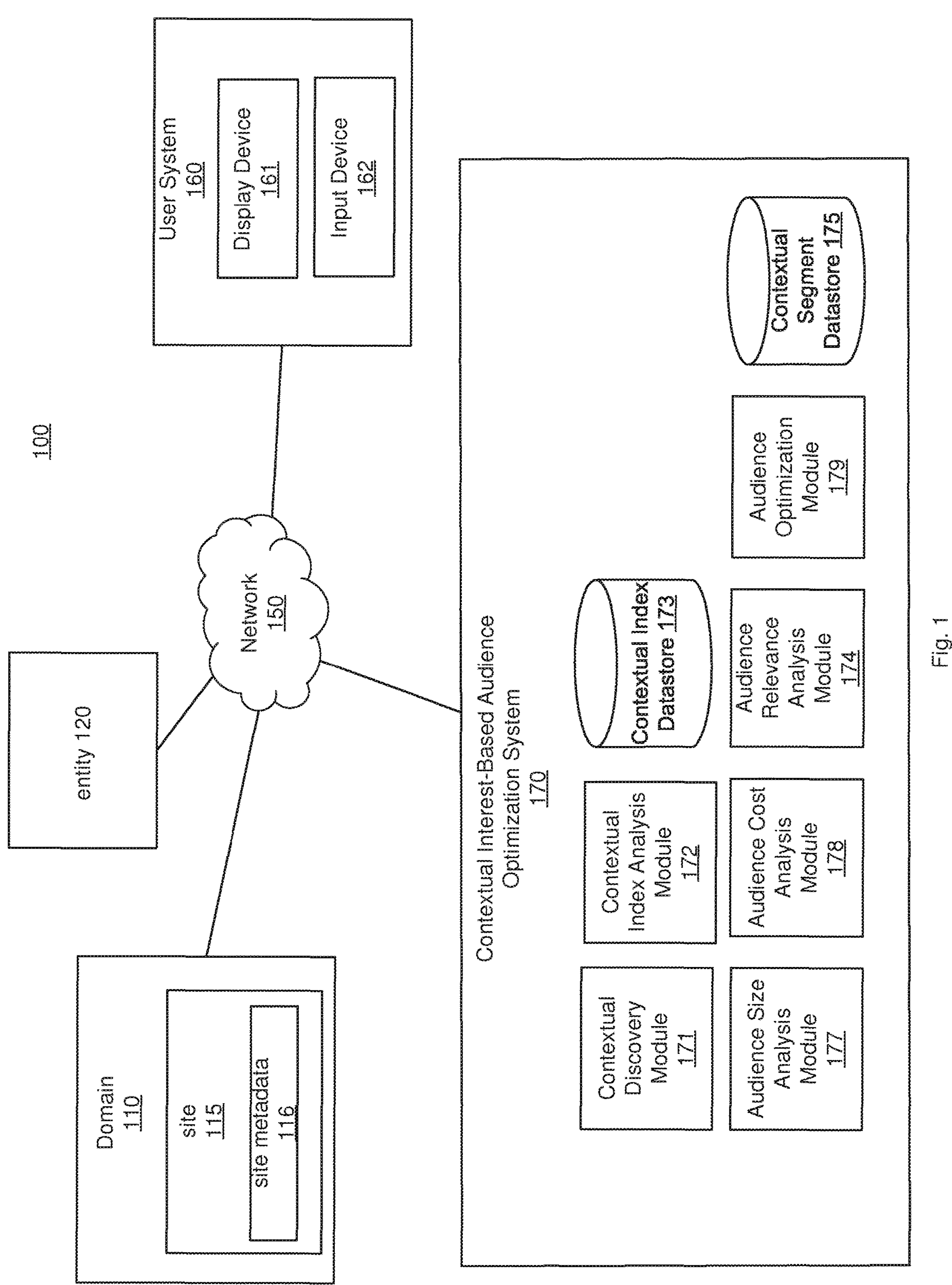
FIG. 1 illustrates an example contextual interest based audience optimization system computing environment, in accordance with an embodiment.

FIG. 1 illustrates an example computing environment in accordance with an embodiment of the invention. As shown in FIG. 1, the computing environment 100 comprises domain 110, entity 120, user system 160, and contextual interest-based audience optimization system (hereinafter "optimization system") 170. These elements are connected by communication network 150 such as a local area network, a wide area network, a wireless network, an intranet, a cable network, a satellite network, a cellular phone network, an optical network, the Internet, or combinations thereof. Computing environment 100 may include more, fewer, and/or different elements than the ones shown in FIG. 1. Moreover, the functionalities can be distributed among the elements in a different manner than described here.

Domain 110 is a media channel provided by a publisher which provides content over communications network 150 to entity 120. Domain 110 comprises site 115. Examples of site 115 comprise web sites, mobile sites, a mobile/desktop applications, and video delivery services (e.g., television, streaming services, or connected TV). Site 115 comprises site metadata 116. Site metadata 116 comprises information provided by the publisher about site 115, including information about the context of site 115. Examples of information about the context of site 115 may comprise a title corresponding to the site, a description of the site, a context corresponding to the site, one or more topics corresponding to the site, and one or more keywords related to the topics or to the context of the site. The information about the context of site 115 may be referred to as a "label." Site 115 may be "labeled" with information provided by the publisher about the context of site 115. Site 115 may be "unlabeled," i.e., the publisher has not provided information about the context of site 115. Although only one site 115 is shown in FIG. 1 for clarity, domain 110 may contain any number of sites.

Entity 120 accesses domain 110 over communication network 150. Examples of entities 120 include software installations, hardware devices, or both. Software installations may include a web entity instance, a mobile application instance, a video viewer instance, or set-top box software residing on a hardware device. A hardware device may be comprise a computer, personal digital assistant (PDA), cell phone, or set-top unit (STU) such as a STU used in conjunction with television service. A consumer is a person or group of people who access domain 110 via entity 120. For example, a consumer may operate entity 120 installed on a laptop computer to access domain 110. In some cases, entity 120 comprises a combination of entities which are logically grouped together to represent individuals, households, or groups of individuals who access domain 110. Although only one entity 120 is shown in FIG. 1 for clarity, any number of entities may be connected to the communication network 150.

User system 160 is a computer used to access optimization system 170 over communication network 150 in order to generate and optimize contextual interest-based audiences. User system 160 comprises display device 161 and input device 162. Display device 161 displays graphical information provided by optimization system 160 in a graphical user interface ("interface" or "GUI"). Examples of display device 161 comprise a display monitor, screen, or other types of display devices. Input device 162 enables a user to provide input to optimization system 160. Examples of input device 162 comprise a mouse, track ball, touch screen, keyboard, microphone, motion sensor, or other type of input device connected to display device 161. Input device 162 may comprise display device 161 configured as a touch screen or other type of interactive display device. Providing input using input device 162 may comprise clicking a button on a mouse, pushing a key on a keyboard, tapping on a touch screen, speaking into a microphone, or other types of input actions. User system 160 may be operated by a user such as a campaign manager or a campaign control system. User system 160 may include additional, fewer, and/or different modules than the ones shown in FIG. 1. Moreover, the functionalities may be distributed among the modules in a different manner than described here.

Optimization system 170 analyzes sites to determine context, topics, and/or keywords (and their corresponding rankings) for sites such as site 115; provides an interface on display device 161 to display the analyzed sites and corresponding context, topics, keywords, site audience relevance/size/cost, and audience relevance/size/cost; receives inputs from input device 162; based on the received inputs, generates audience segments (or "segments") comprising selected sites to optimize audience relevance, audience size, and audience cost; and saves generated audience segments. Optimization system 170 comprises contextual discovery module 171, contextual index analysis module 172, contextual index datastore 173, audience size analysis module 177, audience cost analysis module 178, audience relevance analysis module 174, contextual audience optimization module 179, and contextual segment datastore 175. Optimization system 170 may include additional, fewer, and/or different modules than the ones shown in FIG. 1. Moreover, the functionalities may be distributed among the modules in a different manner than described here.

Contextual discovery module 171 accesses content of published sites and analyzes the site content to identify and rank the topics and/or keywords associated with each site. The content may comprise textual, graphical, video, audio, metadata, and other content. Contextual discovery module 171 analyzes the content of a site to determine keywords and corresponding prevalence of the keywords. Keywords may comprise text, graphics, audio content, or video content. Keywords may contain n-grams (i.e., contiguous sequences of text items, such as syllables, letters, words or base pairs). Keywords may be weighted by factors such as placement (e.g., within a webpage) or size of text of keywords.

Contextual discovery module 171 may analyze site context by representing a site using dense vectors (e.g., GloVe (global vectors for word representations)) that are computed as a weighted aggregation of the top-N descriptive keywords corresponding to the site. Keywords may comprise textual, graphical, video, audio, metadata, and other content associated with the site, where weights are proportional to the rarity of a word over the whole internet. Contextual discovery module 171 may analyze the resulting vectors using techniques such as TF-IDF, doc2vec, or deep neural network based contextual sentence embeddings-transformer+self-attention architectures to identify the keywords most highly represented (i.e., most "prevalent") on the site. Contextual discovery module 171 may use transformer networks architectures (such as BERT (Bidirectional Encoder Representations from Transformers), where the transformer is a sequence model that forgoes the recurrent structure of recurrent neural networks for a fully attention-based approach. Contextual discovery module 171 may rank the prevalence of the determined keywords on a site, and may rank the relevance of the determined keywords on the site based on the prevalence of the determined keywords. Contextual discovery module 171 may rank the prevalence or relevance of keywords by category such as "high," "medium," and "low", or by order, such as first, second, etc.

Contextual discovery module 171 uses the determined keywords, and corresponding keyword prevalence, of each site to determine topics, and corresponding topic rankings, associated with the site. Contextual discovery module 171 may also use information provided by publishers about the context of a site (i.e., labeled sites) to determine topics, and corresponding topic rankings, associated with the site. Contextual discovery module 171 may also use information from other sources to determine topics, and corresponding topic rankings, associated with the site. For example, contextual discovery module 171 may use information about the site provided by another source such as a review, reference, or recommendation of the site (or content on the site). Contextual discovery module 171 may rank the prevalence of determined topics and topic rankings on a site by category, such as "high," "medium," and "low" relevance, or by order, such as first, second, etc.

In an example, contextual discovery module 171 may determine the keywords associated with a site, in prevalence order, are "dog," "collar," "bowl," and "leash." In this example, contextual discovery module 171 may determine "dog products" is the highest ranked topic associated with the site, and "dog" is the second highest ranked topic associated with the site.

Contextual discovery module 171 may generate tags corresponding to sites based on determined topics, topic rankings, keywords, and/or keyword ranking. For example, contextual discovery module 171 may generate the tag "dog owner" for all sites with highly ranked topics that are of high interest to dog owners, such as sites with a determined topic of "dog food" or "dog videos." Tags may speed up analysis of the corresponding data by enabling searching based on tags instead of keywords and/or topics. For example, searching for the single tag "dog owner" may be faster than searching for the multiple keywords "dog food" or "dog videos." In another example, if contextual discovery module 171 has previously analyzed a site and determined the relevant keywords and a determined topic of "dog food," and then identifies a new keyword "probiotic" with high prevalence on the site, contextual discovery module 171 may generate a tag "trending" for the site. Contextual discovery module 171 may re-analyze sites previously identified with the topic "dog food" to determine if the trending keyword "probiotic" is used. Contextual discovery module 171 may then associate the tag with sites that use "probiotic" with the tag "trending," which may increase the value of the site for a campaign that is targeting dog owners that prefer trending topics.

Contextual discovery module 171 stores information corresponding to an analyzed site in at least one contextual index in contextual index data store 173. Each entry in a contextual index may comprise an identifier corresponding to a site (e.g., an identifier based on the corresponding url) and corresponding topics, topic rankings, keywords, keyword rankings, and tags associated with the site. Contextual discovery module 171 may configure a contextual index as an inverted index, with each entry comprising a keyword (or topic or tag) and corresponding sites. Contextual discovery module 171 stores the contextual index or indices in contextual index data store 173.

Advantageously, contextual discovery module 171 may analyze sites at the same time or at a different time than contextual index analysis module 172, audience size analysis module 177, audience cost analysis module 178, audience relevance analysis module 174, and audience optimization module 179 operate. In this way, contextual discovery module 171 can use resources that are underused at certain times (e.g., at night or during the day in certain time zones) while the other modules may operate when users are active (e.g., during the day).

Contextual index analysis module 172 analyzes a contextual index stored in contextual index data store 173 to provide data about sites and their corresponding topics, topic rankings, keywords, keyword rankings, and tags to audience size analysis module 177, audience cost analysis module 178, audience relevance analysis module 174, and audience optimization module 179. Advantageously, contextual index analysis module 172 may use different computing resources than used by the other modules, allowing the modules to use resources efficiently. Advantageously, contextual index analysis module 172 may analyze the data at the same time or at a different time than the other modules operate, enabling the use of resources that are underused at certain times. Advantageously, contextual index analysis module 172 may use resources and techniques that are optimized to efficiently create, query, and analyze the contextual indices, including different techniques for different indices, while the other modules can use resources and techniques that are optimized to complete their corresponding tasks.

Audience size analysis module 177 accesses available audience size data related to sites in the contextual index to determine an approximate site audience size (or number of visitors, or "reach") for each of the sites. The site audience size data may be provided by the publisher of a site, by a third-party vendor, by a direct measurement system, and/or by a campaign manager or campaign control system. Audience size analysis module 177 may store the site audience size information in an entry in a contextual index. Audience size analysis module 177 may provide site audience size information to audience optimization module 179, or contextual index analysis module 172 may provide it to audience optimization module 179.

Audience cost analysis module 178 accesses available audience cost data related to the sites in the contextual index to determine an approximate site audience cost to provide supplemental content to entities visiting each site. The site audience cost data may be provided by the publisher of the site, a third-party vendor, a direct measurement system, and/or a campaign manager or a campaign control system. The site audience cost data may also be provided as part of an auction system. In this case, the audience cost analysis module may determine an estimated cost to bid on an opportunity associated with a site based on historical data of winning bid amounts associated with the site. In some embodiments, all of the opportunities to provide supplemental content to entities visiting a particular site may be purchased by a campaign manager or a campaign control system (i.e., "premium inventory"). The available cost data may be based on historical purchase prices for premium inventory associated with the site or based on a sale price provided by the publisher of the site. Audience cost analysis module 178 may store site audience cost information in an entry in a contextual index. Audience cost analysis module 178 may provide audience cost information to audience optimization module 179, or contextual index analysis module 172 may provide it to audience optimization module 179.

Audience relevance analysis module 174 receives data about sites from contextual index size analysis module 172, including their corresponding topics, topic rankings, keywords, keyword rankings, and/or tags. Audience relevance analysis module 174 analyzes the site data with respect to a preferred keyword (and/or topic and/or tag) to determine the relevance of each site compared to the preferred topic or keyword (i.e., site relevance), as described below with respect to FIGS. 2-8. Audience relevance analysis module 174 may identify related keywords related to a preferred topic and/or keyword and/or tag. For example, related keywords may be variations of the preferred topic/keyword/tag, synonyms of the preferred topic/keyword/tag, or topics/keywords/tags otherwise identified as related to the preferred topic/keyword/tag. Audience relevance analysis module 174 instructs contextual index analysis module 172 to identify sites in the contextual index corresponding the preferred topics/keywords/tags and/or related topics/keywords/tags, or having related topics/keywords/tags. Audience relevance analysis module 174 may instruct contextual index analysis module 172 to identify sites having the preferred/related topics/keywords/tags above a threshold ranking). Contextual index analysis module 172 provides the identified sites and corresponding data to audience relevance analysis module 174. In some embodiments, Audience relevance analysis module 174 instructs contextual index analysis module 172 to identify sites in the contextual index preferred topics/keywords/tags and audience relevance analysis module 174 analyzes the identified sites to determine sites having the preferred/related topics/keywords/tags above a threshold ranking. For example, contextual index analysis module 172 or audience relevance analysis module 174 may use prevalence of a preferred keyword (or related keywords) corresponding to a site to determine the relevance of the site compared to the preferred keyword. The identified sites have the desired relevance (e.g., have a relevance ranking above a threshold) compared to the preferred topic/keyword/tag. Audience relevance analysis module 174 may rank sites by determined site relevance compared to a preferred topic/keyword/tag, such as "high," "medium," and "low" relevance, or by order, such as first, second, etc. Audience relevance analysis module 174 may store audience relevance compared to a preferred topic/keyword/tag in an entry in a contextual index. Audience relevance analysis module 174 may provide audience relevance information to audience optimization module 179, or contextual index analysis module 172 may provide it to audience optimization module 179.

Audience optimization module 179 receives data from contextual index analysis module 172, audience size analysis module 177, audience cost analysis module 178, and audience relevance analysis module 174; receives inputs from input device 162 of user system 160; provides user interfaces (i.e., "UIs") to be displayed on display device 161 of user system 160 that display information related to sites; enables a user to select sites based on the displayed information; and enables a user to save selected sites in contextual segment data store 175. The operation of audience optimization module 179 is described in detail below with reference to FIGS. 2-8.

FIGS. 2-8 illustrate UIs provided by audience optimization module 179 to user system 160 that enable a user to easily view the intersection of information related to site context, relevance of site context, site audience size, site audience cost, audience relevance, audience size, and audience cost, and to enable a user to select of sites until a preferred combination of audience size, audience cost, and audience relevance is reached.

Figure 2:
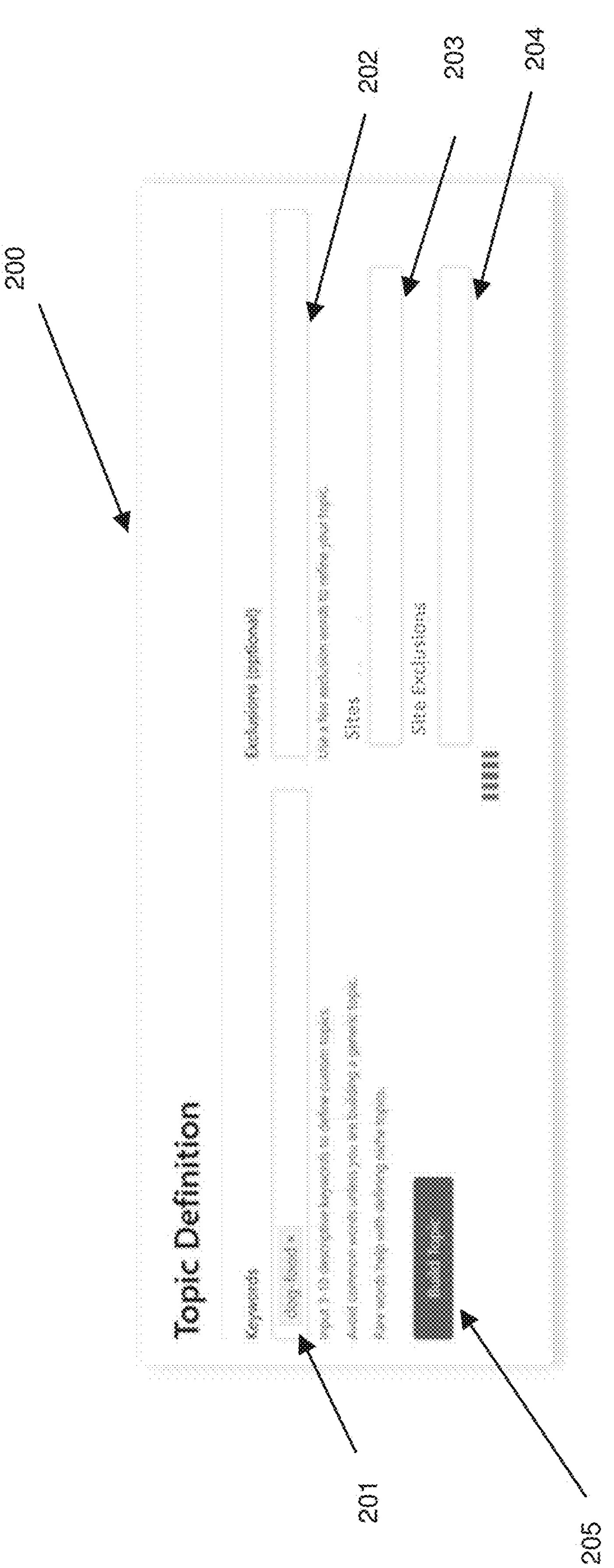
FIG. 2 is an example of a keyword input interface, in accordance with an embodiment of the invention.

FIG. 2 illustrates keyword input interface 200, provided by audience optimization module 179 to user system device 160, which enables a user to enter keywords and/or sites to be included or excluded from an optimization process (i.e., keywords and/or sites corresponding to a desired context (or topic) or tag). Audience optimization module 179 provides the UIs discussed in reference to FIGS. 2-8 below to display device 161. The user uses input device 162 to send information or selections to audience optimization module 179, which displays the entered information or selections in the UIs (i.e., the user "enters" or "selects" information in the UIs). Keyword input interface 200 comprises keyword inclusion interface 201, keyword exclusion interface 202, site inclusion interface 203, site exclusion interface 204, and start optimization process selector 205. Keyword input interface 200 may include more, fewer, and/or different interfaces than the ones shown in FIG. 2. Moreover, the functionalities can be distributed among the interfaces in a different manner than described here.

A user enters keywords to be included in the optimization process in keyword inclusion interface 201 (i.e., "preferred" keywords), keywords to be excluded in keyword exclusion interface 202, sites to be included in site inclusion interface 203, and sites to be excluded in site exclusion interface 204. During the optimization process, sites that are relevant to the included keywords will be selected while sites containing excluded keywords (or containing excluded keywords as highly ranked keywords or sites that are relevant to the excluded keywords) will be excluded. During the optimization process, included sites will be included (or more heavily weighted in the analysis) while excluded sites will be excluded (or less heavily weighted in the analysis). FIG. 2 illustrates a first step of an example optimization process. In this example, the desired context (or topic) is "dog-food" and the user enters the keyword "dog-food" in keyword interface 201. After entering included and/or excluded keywords and/or sites, the user provides a signal to audience optimization module 179 by selecting optimization process selector 205.

Upon receiving indication of selection of optimization process selector 205, audience optimization module 179 requests audience relevance analysis module 174 and contextual index analysis module 172 to identify and provide sites, and data corresponding to the sites (e.g., keywords, topics, and/or tags associated with the relevant sites (or keywords, topics, or tags having a ranking about a threshold associated with the relevant sites)), from the contextual index stored in contextual index datastore 173 that are relevant (or have a relevance ranking above a threshold) compared to the included keywords (i.e., "dog-food), based on the desired relevance. The desired relevance may be a default relevance (e.g., "high" relevance) or may be entered as described below with respect to FIG. 5

In an example where the user enters sites for inclusion and/or exclusion, audience optimization module 179 provides the included and/or excluded sites to contextual index analysis module 172. Contextual index analysis module 172 may analyze all sites in the contextual index and, for example, apply a higher weight to the included sites and apply a lower weight to excluded sites during analysis. Alternatively, contextual analysis module 172 may only analyze included sites (e.g., if the user entered "all other" in site exclusion interface 204), or may not analyze excluded sites.

Figure 3:
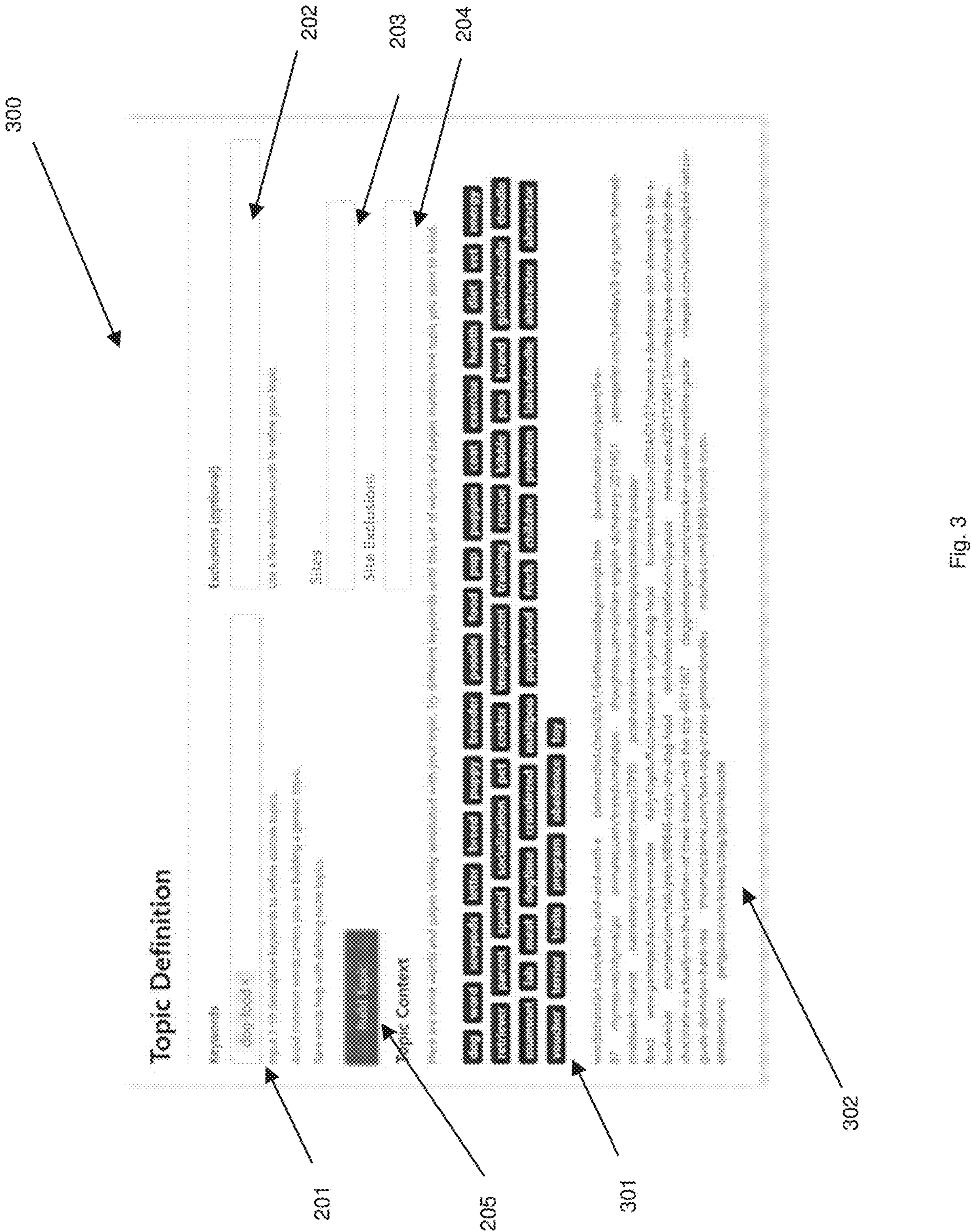
FIG. 3 is an example of a keyword content interface, in accordance with an embodiment of the invention.

FIG. 3 illustrates keyword content interface 300, provided by audience optimization module 179 to user device 160, which enables a user to view the relevant sites identified by audience relevance analysis module 174 or contextual index analysis module 172, and the topics, keywords, and/or tags associated with the relevant sites. Keyword content interface 300 comprises keyword inclusion interface 201, keyword exclusion interface 202, site inclusion interface 203, site exclusion interface 204, relevant keyword interface 301 and relevant site interface 302. Keyword content interface 300 may include more, fewer, and/or different interfaces than the ones shown in FIG. 3. Moreover, the functionalities can be distributed among the interfaces in a different manner than described here.

Relevant keyword interface 301 displays the list of all keywords (or topics or tags) associated with the relevant sites, or all keywords (or topics or tags) associated with the relevant sites having a ranking above a threshold. Relevant site interface 302 displays a list of the relevant sites. Continuing the example from above FIG. 2 above, FIG. 3 illustrates relevant keywords and relevant sites based on the input of "dog-food" in keyword input interface 200, illustrated in FIG. 2. The user may enter additional keywords for inclusion in keyword inclusion interface 201. Alternatively, the user may add additional keywords for inclusion by selecting keywords in relevant keyword interface 301, for example by left-clicking or single clicking a keyword. The user may enter additional keywords for exclusion in keyword exclusion interface 202. Alternatively, the user may add additional keywords for exclusion by selecting keywords in relevant keyword interface 301, for example by right-clicking or double clicking a keyword. The user may similarly add other sites for inclusion or exclusion.

After entering additional included and/or excluded keywords and/or sites, the user provides a signal to audience optimization module 179 by selecting optimization process selector 205. Audience optimization module 179 then requests contextual index analysis module 172 to re-analyze the sites in the contextual index to identify an updated list of relevant sites, retrieve keywords, topics, and/or tags associated with the updated relevant sites, and provide them to audience optimization module 172. Audience optimization module 172 updates keyword content interface 301 and site content interface 302. Including additional keywords and/or sites may increase the number of relevant sites and relevant keywords, while excluding additional keywords and/or sites may decrease the number of relevant sites and relevant keywords. Increasing the number of relevant sites may increase the approximate audience size corresponding to those sites, while decreasing the number of relevant sites may decrease the approximate audience size corresponding to those sites. However, information about audience relevance, size, and cost is not provided. Also, the list of keywords in relevant keyword interface 301 and the list of sites in relevant site interface 302 are unranked, so the user does not know which keywords and/or sites are more or less relevant to their topic.

Figure 4:
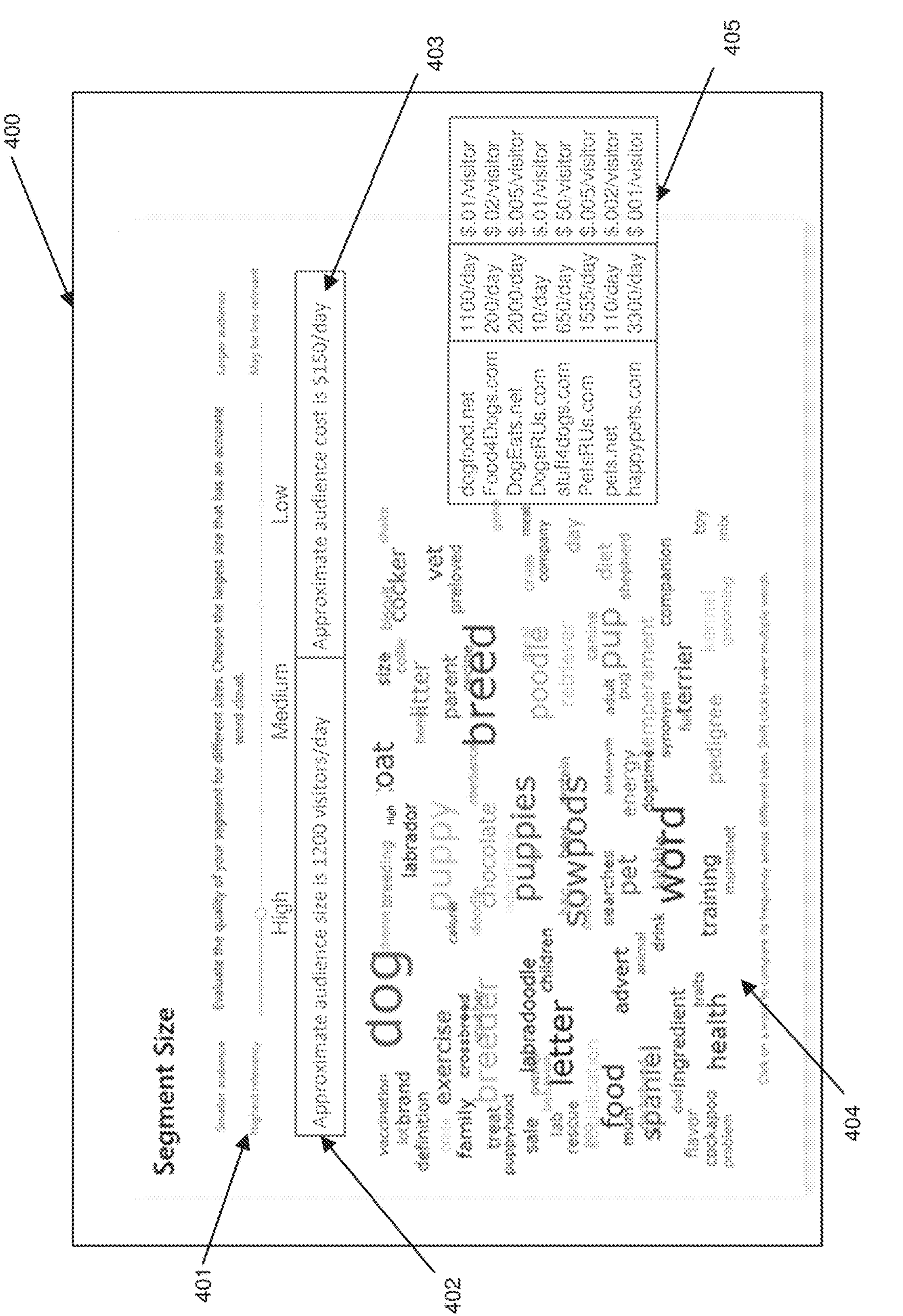
FIG. 4 is an example of an audience optimization interface, in accordance with an embodiment of the invention.

FIG. 4 illustrates audience optimization interface 400, provided by audience optimization module 179 to user device 160, which enables the user to view the relationship between the relevant sites and the approximate audience size and audience cost, and to make selections to further optimize the selection of relevant sites. Audience optimization module 179 may provide audience optimization interface 400 after receiving a selection of selecting optimization process selector 205 in keyword input interface 200 or in keyword content interface 300. Audience optimization interface 400 comprises audience relevance interface 401, audience size interface 402, audience cost interface 403, keyword list interface 404, and site list interface 405. Audience optimization interface 400 may include more, fewer, and/or different interfaces than the ones shown in FIG. 3. Moreover, the functionalities can be distributed among the interfaces in a different manner than described here.

Audience relevance interface 401 displays the audience relevance corresponding to the relevant sites and enables the user to select a relevance level by entering a selection in audience relevance interface 401. Audience size interface 402 displays the approximate audience size corresponding to the relevant sites and enables the user to select an approximate audience size by entering a selection in audience size interface 402. Audience size may be presented, for example, as visitors (or unique visitors) per given time period. Audience cost interface 403 displays the approximate audience cost corresponding to the relevant sites and enables the user to select an approximate audience cost by entering a selection in audience cost interface 403. Audience cost may be presented, for example, cost per given time period or as cost per visitor (or unique visitor). Keyword list interface 404 provides a list of keywords corresponding to the relevant sites and an indication of their prevalence and/or relevance associated with the relevant sites, and enables the user to select a keyword for inclusion or exclusion size by selecting a keyword in keyword list interface 404. Keyword list interface 404 may provide the list of keywords as a word cloud where prevalence and/or relevance is indicated by word size and/or color and/or position, as illustrated in FIG. 4. Alternatively, keyword list interface 404 may provide the list of keywords ranked by prevalence and/or relevance, similar to site list interface 405. Keyword list interface 404 may provide a list of topics and/or tags associated with the relevant sites and an indication of their prevalence and/or relevance associated with the relevant sites (not shown). Site list interface 405 provides the list of relevant sites and corresponding site audience size and site audience cost identified using the analysis described above. Site list interface 405 provides an indication of the site relevance corresponding to each relevant site. For example, site list interface 405 may provide the list of sites ranked based on relevance, as illustrated in FIG. 4. Site list interface 405 may provide the list of sites ranked by approximate site audience size or approximate site audience cost (not shown).

Continuing the example from FIGS. 2-3 above, based on receiving an indication of selection of optimization process selector 205, with a user input of "dog-food" in keyword input interface 200, and based on a default relevance selection of "high" in audience relevance interface 401, audience optimization module 179 directs contextual index analysis module 172 to identify those sites which are relevant for the desired context and provide them to audience optimization module 179. Contextual index analysis module 172 may provide site relevance, site audience size, and site audience cost to audience optimization module 179. Alternatively, audience relevance 179 directs audience size analysis module 177, audience cost analysis module 178, and audience relevance analysis module 174 to determine the site audience size, site audience cost, and site audience relevance, respectively, corresponding to the relevant sites and provide them to audience optimization module 179. Audience optimization module 179 determines approximate audience size based on the corresponding site audiences sizes, and determines approximate audience cost based on the corresponding site audiences costs. Audience optimization module 179 directs contextual index analysis module 172 to identify keywords, topics, and/or tags (or keywords, topics, and/or tags having a ranking above a threshold) corresponding to the relevant sites, and provide them to audience optimization module 179. Audience optimization module 179 provides the approximate audience size in audience size interface 402, the approximate audience cost in audience cost interface 403, the list of keywords, topics, and/or tags and an indication of their prevalence and/or relevance associated with the relevant sites in keyword list interface 404, and the relevant sites and site information (i.e., an indication of site relevance, site audience size, and site audience cost) in site list interface 405.

Figure 5:
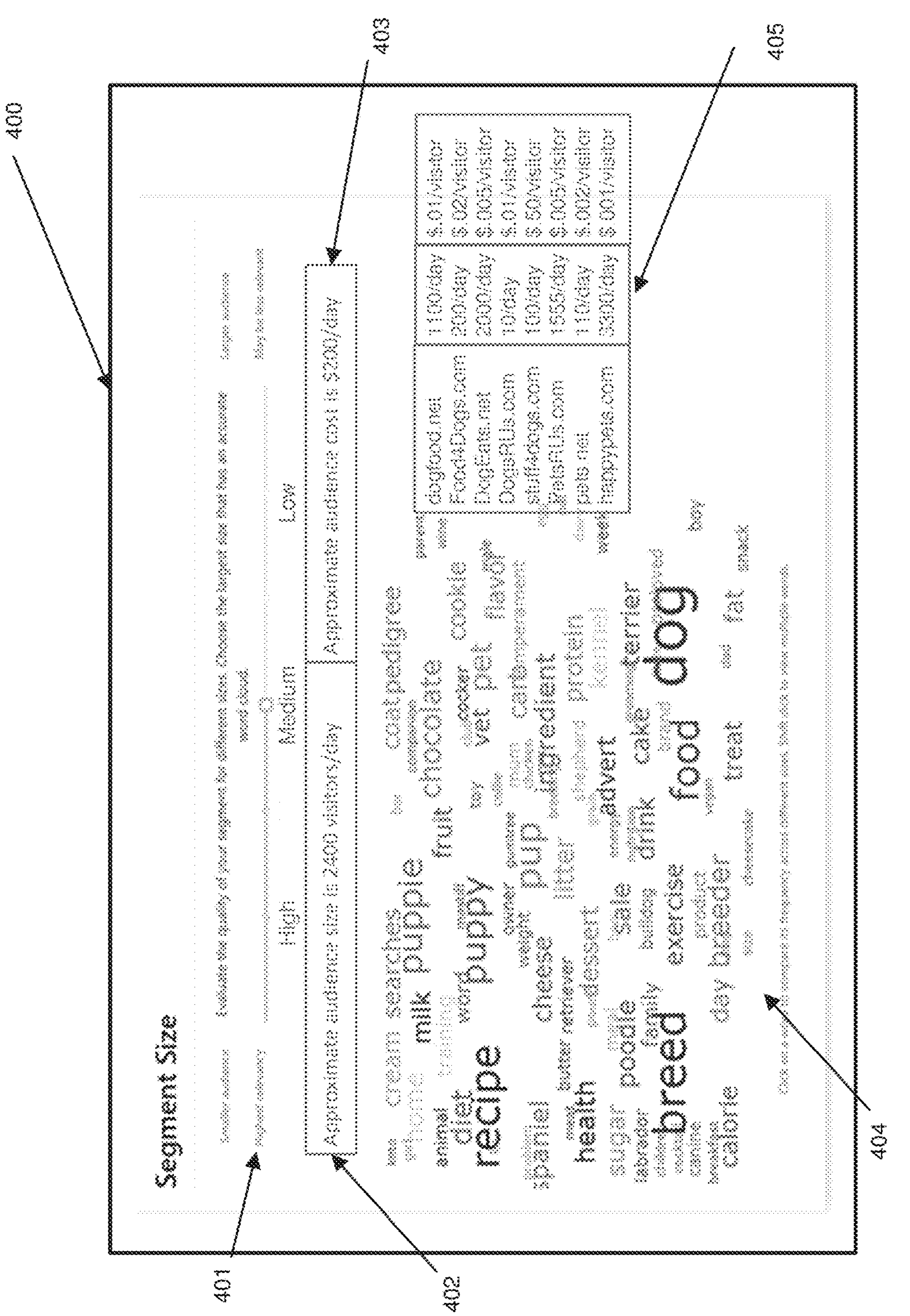
FIG. 5 is an example of an audience optimization interface, in accordance with another embodiment of the invention.

Continuing the example from FIG. 4 above, FIG. 5 illustrates audience optimization interface 400 where the user determines that the approximate audience size is too small based on the results presented in audience optimization interface 400 in FIG. 4. The user may enter a selection for a less relevant audience, such as "medium," in audience relevance interface 401, as shown. Using the analysis described above and the new audience relevance selection, audience optimization module 179 provides updated audience optimization interface 400 shown in FIG. 5, including the updated approximate audience size in audience size interface 402, updated approximate audience cost in audience cost interface 403, updated keywords in keyword list interface 404, and updated site information in site list interface 405. In this example, the approximate audience size has increase to 2400/day (from 1200/day in FIG. 4) and the approximate audience cost has increased to $200/day (from $150/day in FIG. 4) The number of words in the word cloud closely related to "dog food" has decreased, indicating that the selection of "medium" relevance yields less relevant sites than a selection of "high" relevance.

Figure 6:
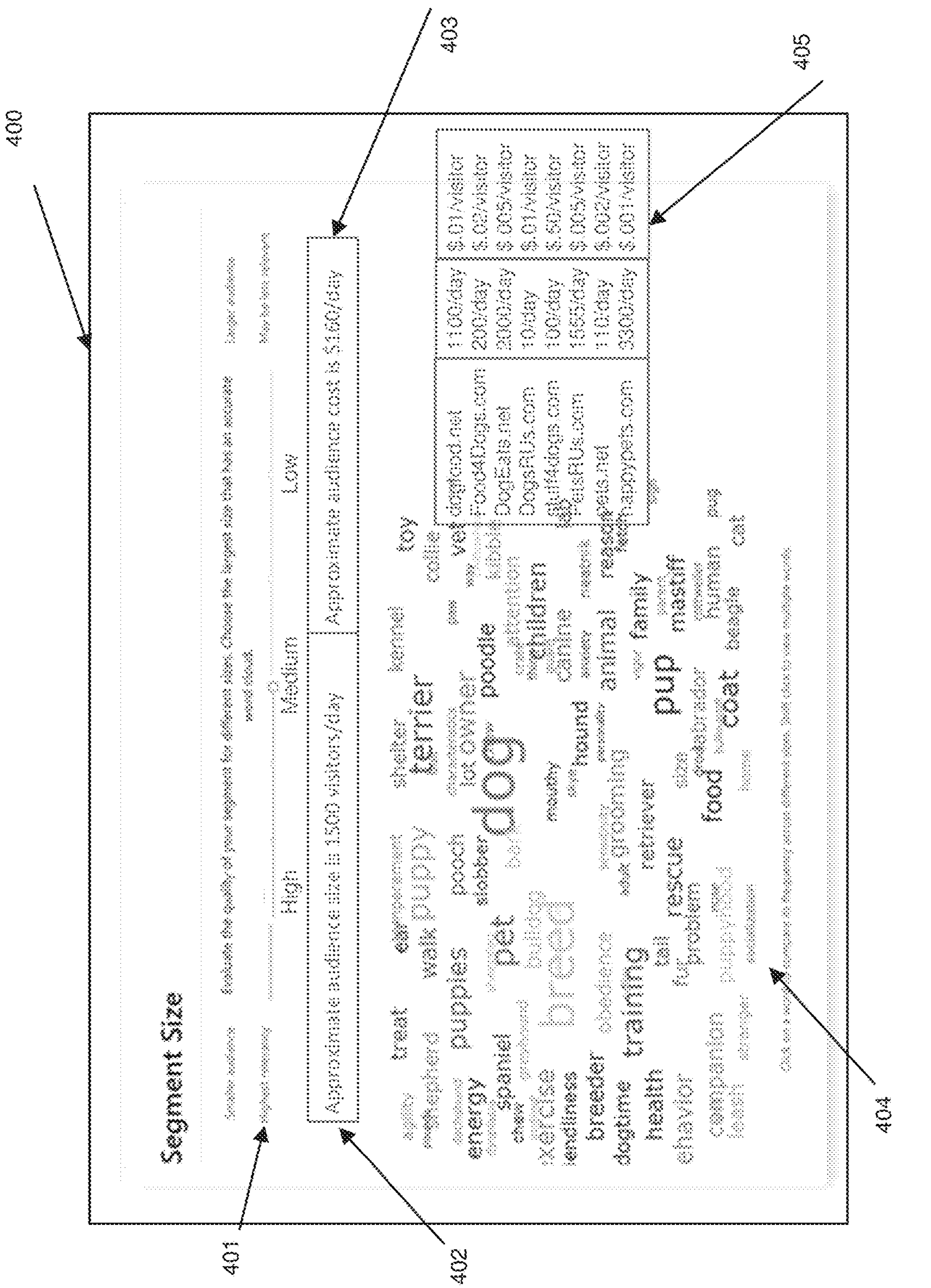
FIG. 6 is an example of an audience optimization interface, in accordance with another embodiment of the invention.

Continuing the example from FIG. 4 above, FIG. 6 illustrates an example where the user determines that that the approximate audience size is too small based on the results presented in audience optimization interface 400 in FIG. 4. The user may select keywords in keyword list interface 404 to add to the list of included keywords. In this example, the user selects the keyword "dog" in keyword list interface 404 because it is the most prevalent keyword in the relevant sites. Using the analysis described above and the new keyword selection, audience optimization module 179 provides updated contextual audience optimizing interface 400 shown in FIG. 6, including the updated approximate audience size in audience size interface 402, updated approximate audience cost in audience cost interface 403, updated keywords in keyword list interface 404, and updated site information in site list interface 405. Audience optimization module 179 also provides updated audience relevance in relevance selector interface 400. In this example, the approximate audience size has increased slightly to 1500 visitors/day (from 1200/day in FIG. 4) and the potential cost has increased slightly to $160/day (from $150/day in FIG. 4). In addition, the number of words in the word cloud related to "dog food" has decreased, indicating that the selection of "dog food" and "dog" yields less relevant sites than just "dog food," and the updated audience relevance interface indicates "medium" relevance.

Figure 7:
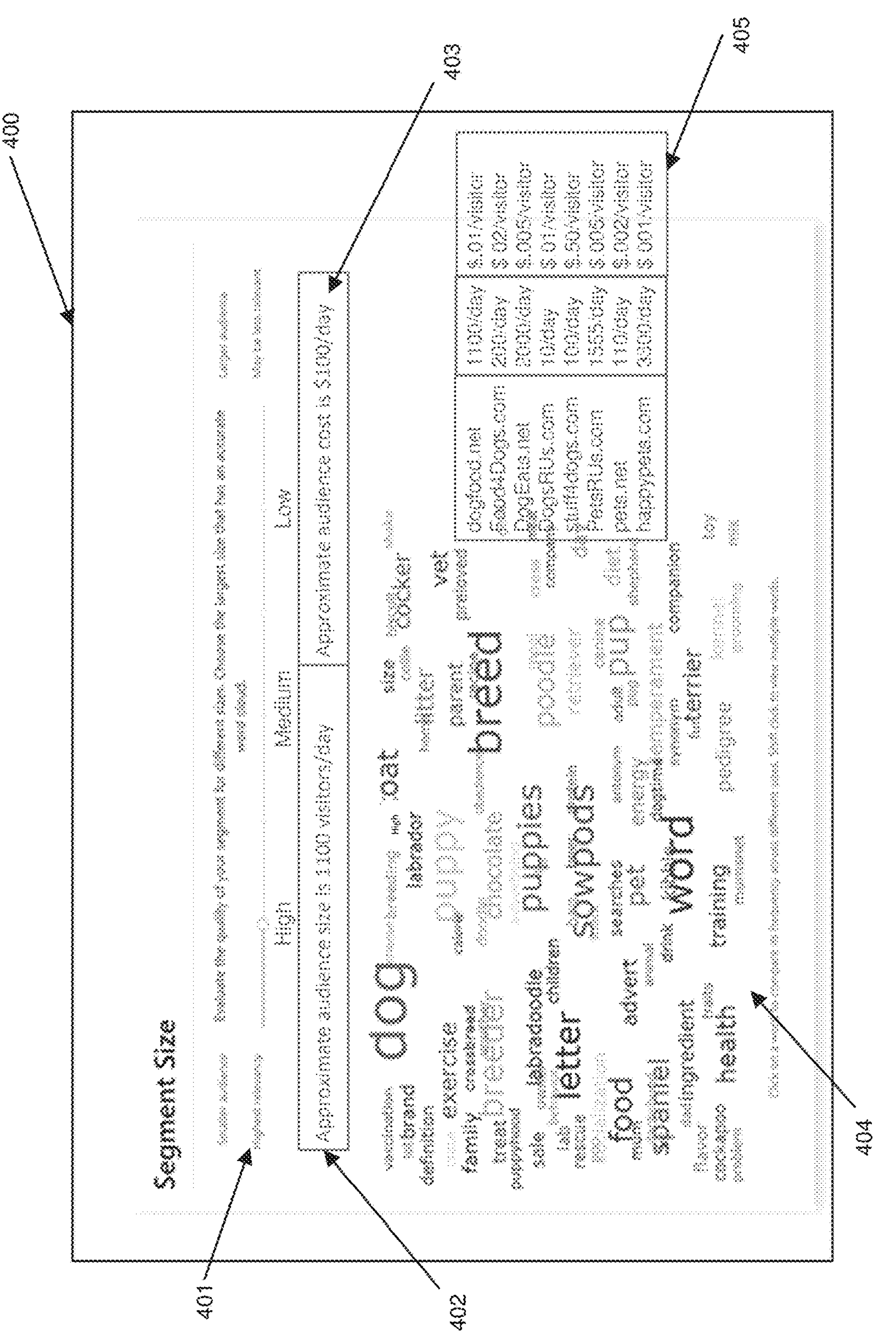
FIG. 7 is an example of an audience optimization interface, in accordance with another embodiment of the invention.

Continuing the example illustrated in FIG. 4, FIG. 7 illustrates an example where the user determines that the approximate audience cost is too high based on the results presented in audience optimization interface 400 in FIG. 4. The user may enter a selection in site list interface 405 to exclude a site from the analysis (e.g., right click or double click a site, or click a site to activate a drop down menu and select "exclude"). For example, the user may exclude the stuff4dogs.com site because it has the highest cost per visitor. Using the analysis described above and excluding the selected site, audience optimization module 179 provides the updated audience optimization interface 400 shown in FIG. 7, including the updated approximate audience size in audience size interface 402, updated approximate audience cost in audience cost interface 403, updated keywords in keyword list interface 404, and updated site information in site list interface 405. In this example, the approximate audience size has decreased by 100 visitors per day to 1100/day (from 1200/day in FIG. 4) and the approximate audience cost has decreased by $50/day to $100/day (from $150/day in FIG. 4) The number of keywords in the keyword list interface 404 closely related to "dog food" has not changed, indicating that excluding the stuff4dogs.com site from the analysis yields sites of approximately the same relevance when excluding the site. In this example, the updated audience relevance interface still indicates "high" relevance.

Using the techniques described with reference to FIGS. 4-7 above, the user can continue to iteratively make selections in the provided interfaces (i.e., keyword input interface 200, keyword content interface 300, and audience optimization interface 400) until a preferred combination of approximate audience size, approximate audience cost, audience relevance, and included/excluded sites is reached. Advantageously, the provided interfaces enable a user to see the complex, inter-dependent relationship between site relevance/size/cost and audience relevance/size/cost. Advantageously, the provided interfaces enables a user to iteratively make selections until a preferred combination of approximate audience size, approximate audience cost, audience relevance, and included/excluded sites is reached. Advantageously, because optimization system 170 is designed to operate efficiently, for example by balancing use of resources (e.g., during busy and non-busy times) and by using data storage and querying techniques that are optimized for analysis of sites and a contextual index, optimization system 170 can provide results of the queries and analyses very quickly to users after a user makes a selection to start analysis based on provided selections. For example, a query of internet-scale data can be completed in less than a minute. The user can then use the provided interfaces to quickly and easily make further selections to optimize the selection of sites until a preferred combination of approximate audience size, approximate audience cost, audience relevance, and included/excluded sites is reached.

Figure 8:
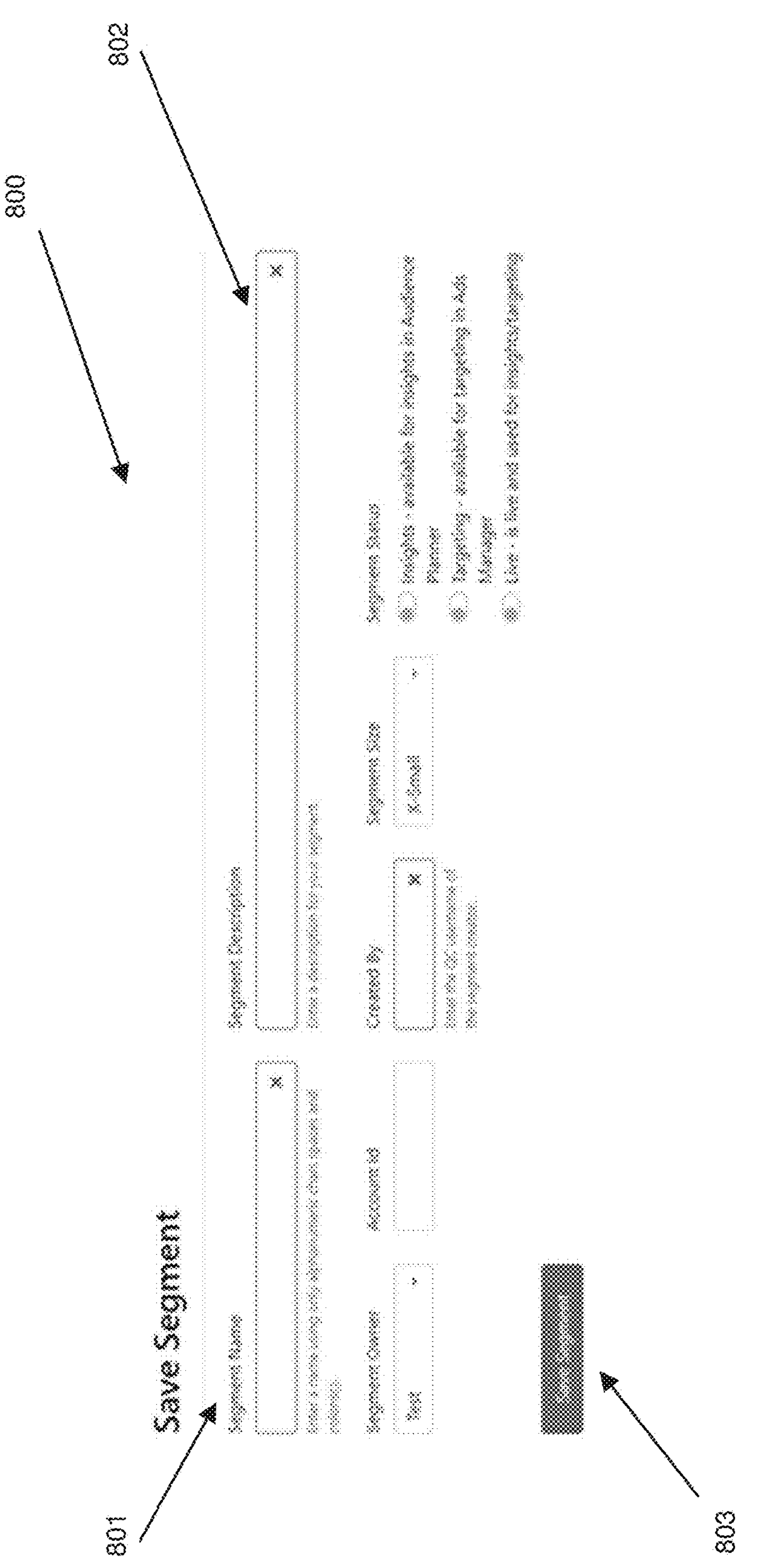
FIG. 8 is an example of a segment save interface, in accordance with an embodiment of the invention.

FIG. 8 illustrates segment save interface 800, provided by audience optimization module 179 to user device 160, which enables a user to save a group of sites selected using the analysis described above as a segment. Audience optimization module 179 provides segment save interface 800 when a user selects a save selections selector (not shown) in keyword content interface 300 or audience optimization interface 400. Segment save interface 800 comprises segment name interface 801, segment description interface 802, and save segment selector 803, and other optional interfaces. Segment name interface 801 enables the user to enter a segment name and displays a segment name. Segment description interface 802 801 enables the user to enter a segment description and displays a segment description. Save segment selector 803 enables the user to save an entered segment and its corresponding information. Segment save interface 800 may comprise other optional interfaces. Segment save interface 800 may include more, fewer, and/or different interfaces than the ones shown in FIG. 4. Moreover, the functionalities can be distributed among the interfaces in a different manner than described here.

Information in the interfaces of segment save interface 800 may be manually entered by the user or automatically entered by optimization system 170. For example, in the examples illustrated in FIGS. 4-7, the segment name may be auto-filled by optimization system 170 as "dog food". When the user selects save segment selector 803, audience optimization module 179 stores the saved audience in contextual segment datastore 175 as a contextual segment index. The contextual segment index comprises entries, where each entry comprises the selected sites and the segment information (i.e., name, description, etc) corresponding to the selected sites. Additionally or alternatively, a contextual segment index may be configured as an inverted index, with each entry comprising a segment name and corresponding sites. Audience optimization module 179 may also store the keywords and/or topics and/or tags, approximate audience size, approximate audience cost, audience relevance, and site information corresponding to the selected sites in contextual segment datastore 175. Audience optimization module 179 may also store the segment name and/or description as a tag. A user may retrieve a saved segment using an interface (not shown) provided by optimizing system 170 to user device 160. When a user retrieves a saved segment, audience optimization module 179 retrieves the corresponding information from the contextual segment index. If needed, audience optimization module 179 requests contextual index analysis module 172 to retrieve the corresponding information from contextual index datastore 173 and provide it to audience optimization module 179. Audience optimization module 179 then auto-populates the appropriate interfaces in keyword input interface 200, keyword content interface 300, and audience optimization interface 400. A user, such as a campaign manager or campaign control system, may also retrieve a saved segment from optimizing system 170 via communication network 150.

Optimization system 170 provides significant advantages for identifying and optimizing contextual-based target audiences:

Firstly, optimization system 170 enables users to identify sites for contextual targeting based on the actual content of the site, not based on contextual information provided by a publisher. Optimization system 170 further enables users to identify sites for contextual targeting that do not have context information provided by a publisher.

Secondly, optimization system can identify multiple topics associated with sites. This enables users to identify sites for contextual targeting based on topics that may not be the primary topic of the sites.

Thirdly, optimization system can provide rankings of topics and/or keywords (based on relevance or prevalence) associated with sites, with a ranking of the topics associated with each site. This enables users to identify sites for contextual targeting based on topics that may not be the primary topic of the sites. Optimization system 170 enables users to identify sites based on relevance rankings as determined by the user, not the publisher.

Fourthly, optimization system 170 provides a graphical interface that illustrates the complex, inter-dependent relationship of topics, keywords, tags, site relevance, site audience size, site audience cost, audience relevance, audience size, and audience cost. As illustrated in FIGS. 2-7, the impact on audience relevance, size, and cost can be difficult to predict based on changes in selections of topics/keywords/tag/sites for inclusion or exclusion. Optimization system 170 enables a user to quickly and easily make changes to all possible inputs, and then quickly and easily see the impact on audience relevance, approximate audience size, and approximate audience cost. The user can quickly and easily iterate input selections to reach a preferred combination of approximate audience size, approximate audience cost, audience relevance, and included/excluded sites.

In another embodiment, an optimization system 170 may use the techniques described above to identify a target audience of entities. Optimization system 170 may identify selected sites using the analysis described above. Optimization system 170 may then identify entities that have previously visited the selected sites. Optimization system 170 may identify entities that have previously visited the selected sites by accessing visiting entity data provided by the site publishers, a third-party vendor, a direct measurement system, a campaign manager, and/or campaign control. Optimization system 170 may save the identified entities in a contextual segment index corresponding to a selected sites. Optimization system 170 may provide the identified entities to user system 160. A user, such as a campaign manager or campaign control system, may also retrieve the identified entities from optimizing system 170 via communication network 150. A user may use the use the identified entities to identify other similar entities (e.g., using modeling, such as look-alike modeling). A user may then target the identified entities, or similar entities for receiving supplemental content (e.g., through a real-time bidding exchange system).

A user, such as a campaign manager or campaign control system, may use the information determined by optimization system 170 to manage a campaign to provide targeted entities with supplemental content. As described above, the user may use the information determined by optimization system 170 to identify sites to target. The user may purchase the opportunity to provide supplemental content to entities visiting an identified site, for example, directly from the publisher of the site (i.e., "premium inventory) or through a bid exchange system (e.g., a real-time bid exchange system). As described above, the user may use the information determined by optimization system 170 to identify entities to target. The user may purchase the opportunity to provide supplemental content to identified, or similar entities, for example, by receiving information indicating that an entity visiting a site is one of the identified entities (e.g., using cookies). The user may use information determined by optimization system 170 in deciding how much to pay for the opportunity to provide supplemental content to entities (e.g., by purchasing premium inventory or by bidding on an opportunity received from an auction system such as a real-time bidding exchange system). The user may use information determined by optimization system 170 in deciding what supplemental content to provide.

Figure 9:
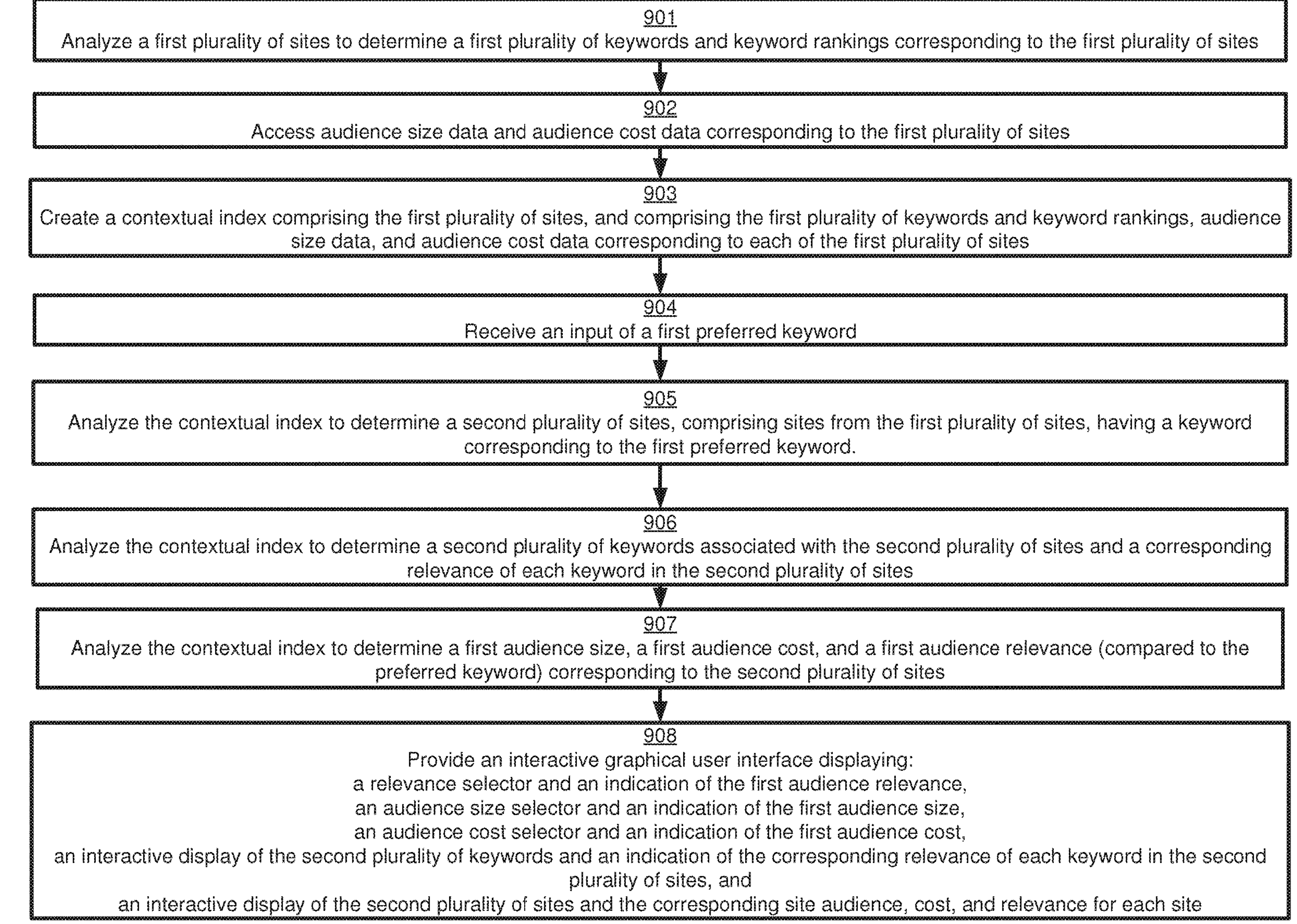
FIG. 9 is a flow chart illustrating a method for contextual interest based audience optimization, in accordance with an embodiment of the invention.

FIG. 9 is a flow chart illustrating a method for providing a contextual interest-based audience optimization interface, according to an embodiment of the invention described above with reference to FIGS. 1-8. In some implementations, the steps are performed in an order other than the order presented in FIG. 9. In other implementations, more, fewer, or alternative steps may be performed.

At step 901, optimization system 170 accesses content of a first plurality of sites and analyzes the content of the sites to identify and rank keywords associated with each site. The content may comprise textual, graphical, video, audio, and metadata content. Optimization system 170 determines a first plurality of keywords and keyword rankings associated with the first plurality of sites. Keywords may comprise textual, graphical, audio, video, or metadata content. Optimization system 170 may analyze the sites identify and rank and a first plurality of topics associated with the first plurality of sites. Optimization system 170 may generate a first plurality of tags corresponding to the first plurality of sites based on determined topics, topic rankings, keywords, and keyword ranking.

At step 902, optimization system 170 accesses site audience size data and site audience cost data corresponding to each of the first plurality of sites.

At step 903, optimization system 170 creates a contextual index comprising entries, where each entry comprises an identifier corresponding to one of the first plurality of sites (e.g., an identifier based on the corresponding url), the first plurality of keywords and corresponding keyword rankings corresponding to the site, and site audience size and site audience cost data corresponding to the site. The entries may comprise the topics and topic rankings of the first plurality of topics topic rankings corresponding to the site, and/or tags corresponding to the site. Optimization system 170 stores the contextual index in contextual index data store 173.

At step 904, optimization system 170 receives a preferred keyword for inclusion. Optimization system 170 may receive a keyword for exclusion, a site for inclusion, and/or a site for exclusion.

At step 905, optimization system 170 analyzes the contextual index stored in contextual index data store 173 to identify a second plurality of sites from the first plurality of sites. Optimization system 170 may analyze the contextual index stored in contextual index data store 173 to identify a second plurality of sites from the first plurality of sites having a site for inclusion, and/or not having a keyword for exclusion, and/or not have a site for exclusion, the first plurality of sites having a first relevance.

At step 906, optimization system 170 analyzes the second plurality of sites in the contextual index to identify a second plurality of keywords corresponding to the second plurality of sites (or a second plurality of keywords corresponding to the second plurality of sites having a keyword ranking above a threshold), and the corresponding relevance and/or prevalence of each keyword in the second plurality of sites. Optimization system 170 may analyze the second plurality of sites to identify a second plurality of topics and/or tags (and/or corresponding relevance and/or prevalence of each of the second plurality of topics and/or tags) in the second plurality of sites corresponding to the second plurality of sites.

At step 907, optimization system 170 analyzes the second plurality of sites in the contextual index to determine a first audience size, a first audience cost, and a first audience relevance (compared to the preferred keyword) corresponding to the second plurality of sites.

At step 908, optimization system 170 provides an interactive graphical user interface displaying a relevance selector and an indication of the first relevance, an audience size selector and an indication of the first audience size, an audience cost selector and an indication of the first audience cost, an interactive display of the second plurality of keywords and an indication of the corresponding relevance of each keyword, and an interactive display of the second plurality of sites and the corresponding site audience size, site audience cost, and site relevance for each site.

Figure 10:
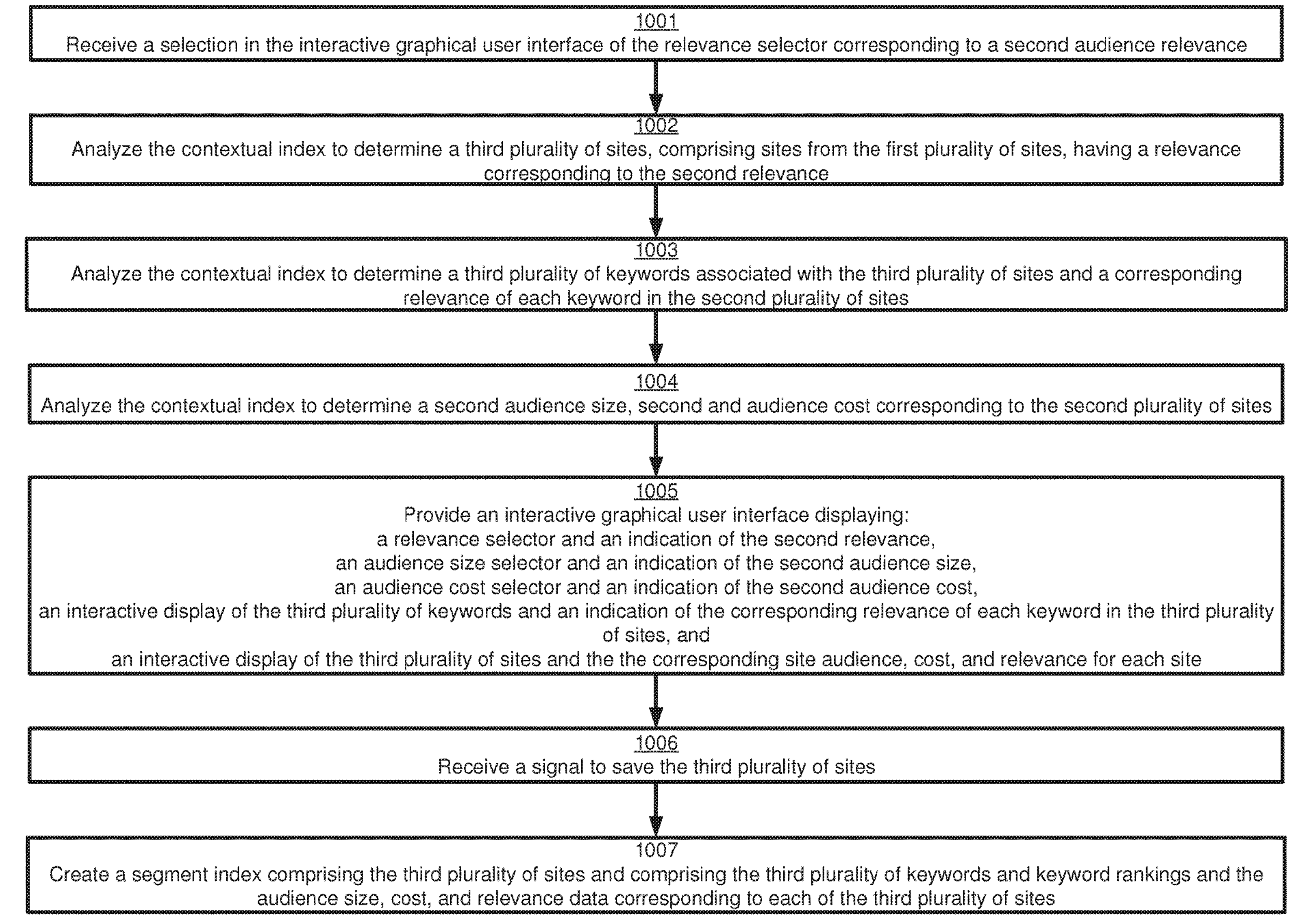
FIG. 10 is a flow chart illustrating a method for contextual interest based audience optimization, in accordance with another embodiment of the invention.

FIG. 10 is a flow chart illustrating a method for contextual interest-based audience optimization, according to an embodiment of the invention described above with reference to FIGS. 1-8. In some implementations, the steps are performed in an order other than the order presented in FIG. 10. In other implementations, more, fewer, or alternative steps may be performed.

Step 1001 in FIG. 10 follows step 908 of the method illustrated in FIG. 9.

At step 1001, optimization system 170 receive a signal indicating a selection of the relevance selector in the interactive graphical user interface corresponding to a second audience relevance. For example, as illustrated in FIG. 5, a user may determine that the approximate audience size is too small based on the results presented in audience optimization interface 400 in FIG. 4; the user may enter a selection for a second audience relevance, i.e., a less relevant audience such as "medium" instead of "high" in audience relevance interface 401.

At step 1002, optimization system 170 analyzes the contextual index stored in contextual index data store 173 to identify a third plurality of sites from the first plurality of sites, the third plurality of sites having the second relevance.

At step 1003, optimization system 170 analyzes the third plurality of sites in the contextual index to identify a third plurality of keywords corresponding to the third plurality of sites (or a third plurality of keywords corresponding to the third plurality of sites having a keyword ranking above a threshold), and the corresponding relevance of each keyword in the third plurality of sites. Optimization system 170 may analyze the third plurality of sites to identify the corresponding prevalence of each keyword in the third plurality of sites. Optimization system 170 may analyze the third plurality of sites to identify a third plurality of topics and/or tags (or a third plurality of topics and/or tags corresponding to the third plurality of sites having a topic and/or tag ranking above a threshold), the corresponding relevance and/or prevalence of each of the second plurality of topics and/or tags corresponding to the third plurality of sites.

At step 1004, optimization system 170 analyzes the third plurality of sites in the contextual index to determine a second audience size and a second audience cost.

At step 1005, optimization system 170 provides an interactive graphical user interface displaying a relevance selector and an indication of the second relevance, an audience size selector and an indication of the second audience size, an audience cost selector and an indication of the second audience cost, an interactive display of the third plurality of keywords and an indication of the corresponding relevance of each keyword, and an interactive display of the third plurality of sites and the corresponding site audience size and site audience cost for each site. In the example illustrated in FIG. 5, the approximate audience size has increased and the approximate audience cost has increased. The number of words in the word cloud closely related to "dog food" has decreased, indicating that the selection of "medium" relevance yields less relevant sites than a selection of "high" relevance.

At step 1006, optimization system 170 receives a signal indicating a selection of a save audience selector in the interactive graphical user interface.

At step 1007, optimization system 170 creates a contextual segment index comprising entries, where each entry comprises one of the third plurality of sites and segment information (i.e., name, description, etc) corresponding to the sites. Each entry may also comprise the keywords and/or topics and/or tags, site audience size, site audience cost, and site audience relevance corresponding to the one of the third plurality of sites. Optimization system 170 stores the contextual segment index in contextual segment data store 175.

Figure 11:
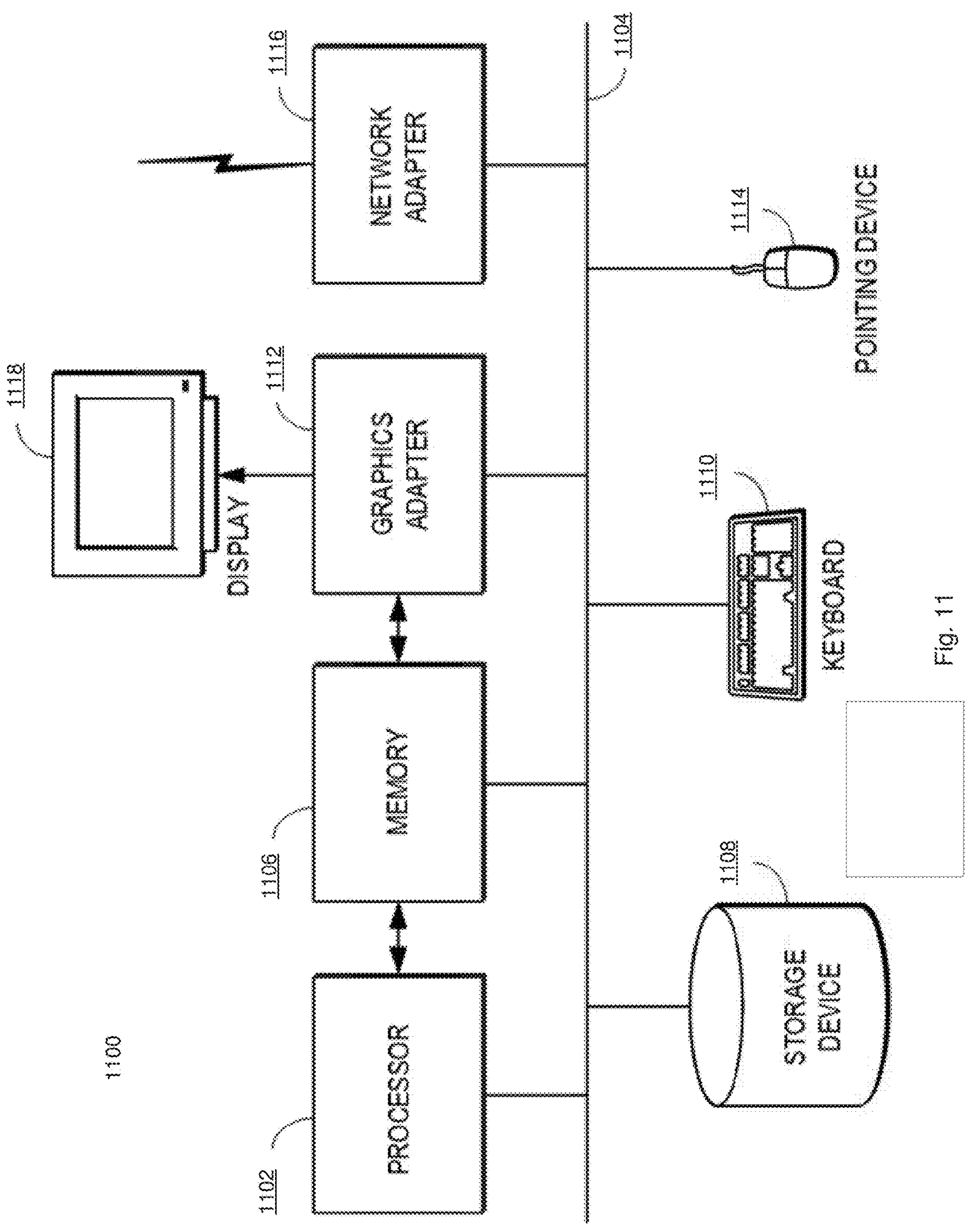
FIG. 11 is a high-level block diagram illustrating an example of a computer for use as a domain 110, entity 120, network 150, user system 160, and/or optimization system 170 of FIG. 1

FIG. 11 is a high-level block diagram illustrating an example of a computer for use as domain 110, entity 120, user system 160, and/or optimization system 170 of FIG. 1. Illustrated are a processor 1102 coupled to a bus 1104. Also coupled to the bus 1104 are a memory 1106, a storage device 1108, a keyboard 1110, a graphics adapter 1112, an input device 1114, and a network adapter 1116. A display 1118 is coupled to the graphics adapter 612.

FIG. 11 comprises a processor 1102 which may be any general-purpose processor. The storage device 1108 is, in one embodiment, a hard disk drive but can also be any other device capable of storing data, such as a writeable compact disk (CD) or DVD, or a solid-state memory device. The memory 1106 may be, for example, firmware, read-only memory (ROM), non-volatile random access memory (NVRAM), and/or RAM, and holds instructions and data used by the processor 1102. The input device 1114 may be a mouse, track ball, stylus, touchscreen, or other type of input device, and is used in combination with the keyboard 1110 to input data into the computer 1100. The graphics adapter 1112 displays images and other information on the display 1118. The network adapter 1117 couples the computer 1100 to the network (not shown). In one embodiment, the network is the Internet. The network can also utilize dedicated or private communications links that are not necessarily part of the Internet.

As is known in the art, the computer 1100 is adapted to execute computer program modules. As used herein, the term "module" refers to computer program logic and/or data for providing the specified functionality. A module can be implemented in hardware, firmware, and/or software. In one embodiment, the modules are stored on the storage device 1108, loaded into the memory 1106, and executed by the processor 1102. The computer 1100 is configured to perform the specific functions and operations by various modules, for example as detailed in FIG. 1, and thereby operates as a particular computer under such program control. The types of computers 1100 utilized by the entities of FIG. 1 can vary depending upon the embodiment and the processing power utilized by the entity.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed:

1. A contextual analysis system, comprising:

a contextual discovery module, configured to:

access a first plurality of published sites;

analyze site content corresponding to each of the first plurality of published sites to identify a plurality of keyword lists, each of the plurality of keyword lists comprising a plurality of keywords corresponding to one of the first plurality of published sites;

based on the analyzing, determine a plurality of keyword ranks, each keyword rank corresponding to at least one of the keywords in each of the plurality of keyword lists; and provide the first plurality of published sites and each of the plurality of keyword lists with the keyword rank associated with each of the keywords in the keyword lists, to a contextual index;

wherein the contextual discovery module utilizes a first set of computing resources, the first set of computing resources utilized by the contextual discovery module optimized to analyze site content; and wherein the contextual discovery module operates in a first time period when the computing resources are underused;

a contextual index analysis module, configured to:

analyze the contextual index; and based on the analyzing the contextual index:

identify each of the plurality of keyword lists, and each of the plurality of keyword ranks corresponding to each of the keywords in each of the plurality of keyword lists, corresponding to each of the first plurality of published sites; and provide the plurality of keyword lists and the plurality of keyword ranks corresponding to each of the first plurality of published sites to the audience analysis module;

wherein the contextual index analysis module utilizes a second set of computing resources, the second set of computing resources utilized by the contextual index analysis module optimized to analyze the contextual index;

an audience analysis module, configured to:

access additional data associated with each of the first plurality of published sites;

in response to receiving a selection from a user system, analyze, for each of the first plurality of published sites:

the additional data associated with each of the first plurality of published sites;

the plurality of keywords associated with each of the first plurality of published sites; and the associated keyword site ranks corresponding to each of the keywords associated with each of the first plurality of published sites; and based on the analyzing:

determine a second plurality of published sites, wherein the first plurality of published sites comprises the second plurality of published sites; and determine a site audience size, a site audience cost, and a site audience relevance corresponding to each of the second plurality of published sites; and provide the determined site audience size, site audience cost, and site audience relevance corresponding to each of the second plurality of published sites to the user system;

wherein the audience analysis module utilizes a third set of computing resources, the third set of computing resources utilized by the audience analysis module are optimized to analyze the additional data, keywords, and keyword ranks;

wherein the audience analysis module operates in a second time period, the second time period different than the first time period, wherein the second time period is a time period when the user is active; and wherein the third set of computing resources is a different set of computing resources than the first set of computing resources; and the user system, the user system configured to:

receive the selection;

provide the selection to the audience analysis system; and receive the determined site audience size, site audience cost, and site audience relevance corresponding to each of the second plurality of published sites;

wherein the user system comprises a display device, the display device configured to display the determined site audience size, audience cost, and audience relevance corresponding to each of the second plurality of published sites.

2. The system of claim 1, wherein:

the first time period is a time period during the night in a time zone and the second time period is a time period during the day in the time zone.

3. The system of claim 1, wherein:

the first time period is a busy time period and the second time period is non-busy time period.

* * * * *